United States Patent
Biswas et al.

(10) Patent No.: US 10,869,214 B2
(45) Date of Patent: Dec. 15, 2020

(54) WIRELESS COMMUNICATION DEVICE AND A METHOD THEREIN FOR REPORTING SIGNAL QUALITY MEASUREMENTS

(71) Applicant: Telefonaktiebolaget LM Ericsson (publ), Stockholm (SE)

(72) Inventors: Ashim Biswas, Sollentuna (SE); Marc Bohlin, Järfälla (SE); Anders Elgcrona, Täby (SE); Nicolas Schrammar, Solna (SE); Magnus Wikström, Sollentuna (SE); Qiang Zhang, Täby (SE)

(73) Assignee: Telefonaktiebolaget LM Ericcson (publ), Stockholm (SE)

( * ) Notice: Subject to any disclaimer, the term of this patent is extended or adjusted under 35 U.S.C. 154(b) by 0 days.

(21) Appl. No.: 16/475,479

(22) PCT Filed: Jan. 12, 2017

(86) PCT No.: PCT/SE2017/050026
§ 371 (c)(1),
(2) Date: Jul. 2, 2019

(87) PCT Pub. No.: WO2018/132044
PCT Pub. Date: Jul. 19, 2018

(65) Prior Publication Data
US 2020/0280869 A1 Sep. 3, 2020

(51) Int. Cl.
*H04W 24/10* (2009.01)
*H04W 4/02* (2018.01)
(Continued)

(52) U.S. Cl.
CPC ........... *H04W 24/10* (2013.01); *H04L 5/0048* (2013.01); *H04W 4/027* (2013.01); *H04W 24/08* (2013.01)

(58) Field of Classification Search
None
See application file for complete search history.

(56) References Cited

U.S. PATENT DOCUMENTS

2012/0020323 A1* 1/2012 Noh ............... H04L 5/0048
370/330
2012/0134338 A1* 5/2012 Ko ............... H04L 5/0091
370/330

(Continued)

OTHER PUBLICATIONS

International Search Report and Written Opinion of the International Searching Authority for International Application No. PCT/SE2017/050026 dated Oct. 6, 2017.

(Continued)

*Primary Examiner* — Anh Vu H Ly
(74) *Attorney, Agent, or Firm* — Sage Patent Group

(57) ABSTRACT

A method performed by a wireless communication device for reporting signal quality measurements. The wireless communication device operates in a wireless communications network and comprises a first wireless network configured with single Demodulation Reference Signals (DMRS) and a second wireless network configured with dual DMRS.

The wireless communication device receives a set of DMRS from the first wireless network and a set of dual DMRS from the second wireless network.

The wireless communication device selects any one or more out of a first activity and a second activity based on the speed of the wireless communication device. The first activity comprises performing first signal quality measurements of the set of single DMRS and reporting at least some of the first signal quality measurements to the wireless communications network, and the second activity comprises performing a second signal quality measurement of the set of dual (Continued)

DMRS and reporting at least some of the second signal quality measurements to the wireless communications network.

19 Claims, 6 Drawing Sheets

(51) Int. Cl.
*H04L 5/00* (2006.01)
*H04W 24/08* (2009.01)

(56) References Cited

U.S. PATENT DOCUMENTS

| | | | | |
|---|---|---|---|---|
| 2014/0126403 | A1* | 5/2014 | Siomina | H04J 11/005 |
| | | | | 370/252 |
| 2014/0128115 | A1* | 5/2014 | Siomina | H04W 24/10 |
| | | | | 455/501 |
| 2014/0293900 | A1* | 10/2014 | Takeda | H04L 1/0003 |
| | | | | 370/329 |
| 2015/0215908 | A1* | 7/2015 | Seo | H04L 27/2613 |
| | | | | 370/329 |
| 2015/0249526 | A1* | 9/2015 | Kim | H04L 5/0051 |
| | | | | 370/329 |
| 2016/0006546 | A1* | 1/2016 | Yi | H04L 5/0094 |
| | | | | 370/329 |
| 2016/0100398 | A1* | 4/2016 | Xia | H04W 72/0413 |
| | | | | 370/330 |
| 2016/0205677 | A1* | 7/2016 | Kim | H04L 5/0048 |
| | | | | 370/329 |
| 2018/0026684 | A1* | 1/2018 | Wei | H04W 72/1289 |
| | | | | 370/329 |
| 2018/0041316 | A1* | 2/2018 | Ko | H04L 5/0048 |
| 2018/0102931 | A1* | 4/2018 | Ko | H04L 5/0017 |
| 2019/0020451 | A1* | 1/2019 | Zhang | H04B 7/0452 |
| 2019/0036661 | A1* | 1/2019 | Ko | H04L 5/0051 |
| 2019/0140801 | A1* | 5/2019 | Ko | H04L 5/0057 |
| 2019/0140806 | A1* | 5/2019 | Andersson | H04L 27/2662 |
| 2019/0312696 | A1* | 10/2019 | Kim | H04W 72/12 |
| 2019/0334749 | A1* | 10/2019 | Tang | H04W 72/042 |

OTHER PUBLICATIONS

Luan et al., "Handover Parameter Optimization of LTE System in Variational Velocity Environment," Proceedings of ICCTA2011, 2011, 5 pages.

ZTE et al., "Discussion on flexible DMRS patterns," R1-1613105, 3GPP TSG RAN WG1 Meeting #87, Reno, USA, Nov. 14-18, 2016, 6 pages.

* cited by examiner

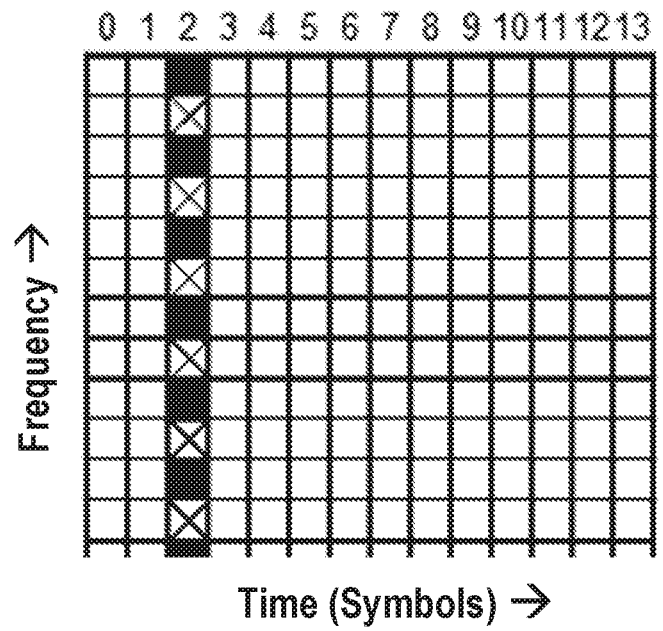
Fig. 1 Single DMRS (Prior Art)
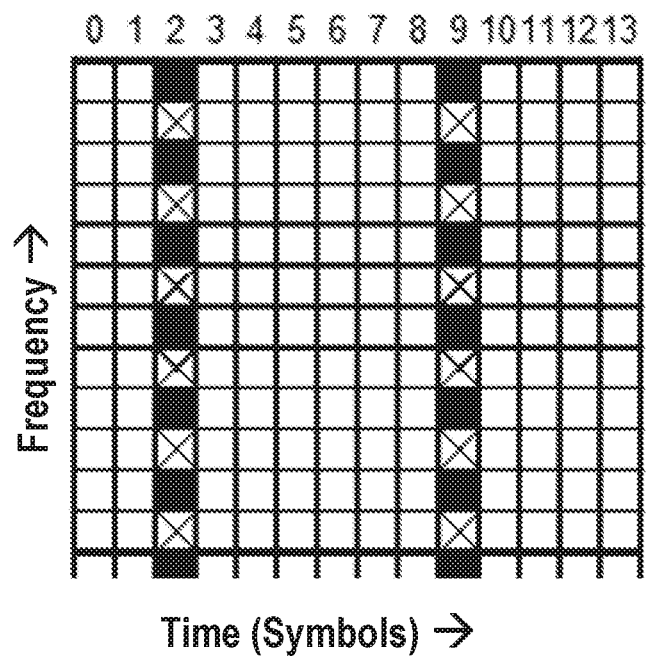
Fig. 2 Dual DMRS (Prior Art)

WIRELESS COMMUNICATION DEVICE AND A METHOD THEREIN FOR REPORTING SIGNAL QUALITY MEASUREMENTS

CROSS REFERENCE TO RELATED APPLICATION

This application is a 35 U.S.C. § 371 national stage application of PCT International Application No. PCT/SE2017/050026, filed on Jan. 12, 2017, the disclosure of which is hereby incorporated herein by reference in its entirety.

TECHNICAL FIELD

Embodiments herein relate generally to a wireless communication device and to methods therein. In particular, embodiments relate to reporting signal quality measurements in a wireless communications network and especially in a wireless communications networks comprising one wireless network configured with single Demodulation Reference Signals (DMRS), and another wireless network configured with dual DMRS.

BACKGROUND

Communication devices such as terminals are also known as e.g. User Equipments (UE), Customer Premises Equipments (CPE), mobile terminals, stations (STAs), wireless devices, wireless terminals and/or mobile stations. Communications devices are enabled to communicate wirelessly in a wireless communications network, such as a Wireless Local Area Network (WLAN), or a cellular communications network sometimes also referred to as a cellular radio system or cellular networks. The communication may be performed e.g. between two communications devices, between a communications device and a regular telephone and/or between a communications device and a server via an access network and possibly one or more core networks, comprised within the wireless communications network.

The above communications devices may further be referred to as mobile telephones, cellular telephones, laptops, or tablets with wireless capability, just to mention some further examples. The communications devices in the present context may be, for example, portable, pocket-storable, hand-held, computer-comprised, or vehicle-mounted mobile devices, enabled to communicate voice and/or data, via the access network, such as a Radio Access Network (RAN), with another entity, such as another terminal or a server.

The communications network covers a geographical area which is divided into geographical subareas, such as coverage areas, cells or clusters. In a cellular communications network each cell area is served by an access node such as a base station, e.g. a Radio Base Station (RBS), which sometimes may be referred to as e.g. "eNB", "eNodeB", "NodeB", "B node", or Base Transceiver Station (BTS), depending on the technology and terminology used. The base stations may be of different classes such as e.g. macro eNodeB, home eNodeB, micro eNode B or pico base station, based on transmission power, functional capabilities and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the communications devices within range of the base stations. In the context of this disclosure, the expression Downlink (DL) is used for the transmission path from the base station to the communications device. The expression Uplink (UL) is used for the transmission path in the opposite direction i.e. from the communications device to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

A Universal Mobile Telecommunications System (UMTS) is a third generation (3G) telecommunication network, which evolved from the second generation (2G) Global System for Mobile Communications (GSM). The UMTS Terrestrial Radio Access Network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain.

Advanced Antenna Systems (AASs) is an area where technology has advanced significantly in recent years and where we also foresee a rapid technology development in the years to come. Hence it is natural to assume that AASs in general and massive Multiple Input Multiple Output (MIMO) transmission and reception in particular will be a cornerstone in a future Fifth Generation (5G) system.

Wireless broadband technologies like 3G, LTE and more recently 5G employ reference signals which are known prior to receiver nodes such as network nodes and wireless communication devices, so the receiver nodes can measure transmission channel characteristics and take necessary corrective actions on signals carrying information. Although transmitting known signals is considered overhead but this helps wireless systems to achieve higher spectral efficiency by transmitting more information per unit of spectrum.

There may be additional complexity of channel characteristics that are constantly changing due to movement of transmitting node or receiving node or even due to movement of objects in the path of propagation of the signal. The channel will change faster if this movement is faster. Any propagation channel is characterized by coherence time which is shortest unit of time during which channel can be assumed to be static. More reference signaling, hence more overhead is required if coherence time is shorter. Hence the reference signals are designed with the minimum specified coherence time, the type of equipment and conditions under which the equipment will operate while minimizing overhead to extracting more spectral efficiency.

One such downlink reference signaling scheme is proposed in 5G is DMRS where certain OFDM symbols, out of total 14, are reserved for transmission of reference signals.

DMRSs are inserted in a time and frequency grid in any transmission from a transmitter, e.g. a network node, to a receiver, e.g. a wireless communication device, when the transmission requires channel estimation at the receiver. The transmission may be a transmission comprising data or control information. The DMRSs comprises reference signals that are known to the receiver at the time of reception. The DMRSs are typically spread out over the time/frequency grid of a transmission in an Orthogonal Frequency Division Multiplexing (OFDM) system to facilitate good channel estimates over a whole resource block.

Two such schemes are Single DMRS depicted in FIG. 1 and Dual DMRS depicted in FIG. 2 that are currently being discussed, where the 3rd symbol in Single DMRS case or 3rd and 10th symbols in Dual DMRS case are reserved for reference signals.

FIGS. 1 and 2 exemplifies DMRSs for one antenna port configuration in one subframe shown over a Physical Resource Block. In FIGS. 1 and 2, some first DMRSs for a first transmission on a first antenna port are placed on every second subcarrier, shown as filled squares, while the positions marked with x are reserved for some second DMRSs of another transmission, on a second antenna port.

The choice of single DMRS vs. dual DMRS is a network operator's design parameter and is tailored to operating environment. For example, one network A, comprising one or many network nodes such as base-stations, is configured for single DMRS because most of the population, i.e. wireless devices, it is serving is mainly static or has low speed like is suburban and/or rural residential areas. Whereas another network B comprising one or many network nodes such as base-stations, that may belong to the same or different operator, is configured for dual DMRS since it is manly serving an expressway and/or railroad where most of the users of wireless devices it serves are moving at high to very high speed and coherence time is very short.

Network selection such as single DMRS vs. dual DMRS is a two-way process where e.g. wireless communication devices such as UEs and Customer Premises Equipment (CPE) reports visible networks with their signal strengths or quality such as e.g. Reference Signal Received Power (RSRP) or Reference Signal Received Quality RSRQ, or both to the serving network node such as e.g. a base-station also referred to as an eNodeB. This information is shared between the network nodes in the network. The best network node such as eNodeB, is then selected for the wireless communication devices depending on reported signal characteristics and available capacity. The selection may be performed by a wireless communication network. The chosen eNodeB then becomes the serving base-station.

Visible networks for a wireless communication device herein means network nodes in a wireless network that is in radio range for the wireless communication device, i.e. the wireless communication device can receive signals from the network nodes in the visible network. To report visible networks means that the wireless communication device measures signals transmitted by the network nodes in the visible network, and reports, often the best, measurement results back to the respective network nodes within the visible network.

In such a mix of network operator configured schemes it is likely a wireless communication device can see, i.e. is in radio coverage of both single DMRS and dual DMRS. This would be prevalent in residential areas near expressway where the same wireless communication device can see, i.e. is in radio coverage of, multiple networks with different configurations. If the i.e. is in radio coverage of reports measurements of all visible base-stations' signals, then the wireless communication network would likely choose the base-station having best signal characteristic.

For some wireless communication devices this would not be an optimal choice.

SUMMARY

An object of embodiments herein is to improve the performance in a communications network providing single and dual DMRSs.

According to one aspect of embodiments herein, the object is achieved by a method performed by a wireless communication device for reporting signal quality measurements. The wireless communication device operates in a wireless communications network. The wireless communications network comprises a first wireless network configured with single Demodulation Reference Signals, DMRS, and a second wireless network configured with dual DMRS. The wireless communication device receives a set of DMRS comprising one or more single DMRS from the first wireless network, and a set of dual DMRS comprising one or more dual DMRS from the second wireless network. The wireless communication device selects any one or more out of a first activity and a second activity based on the speed of the wireless communication device.

The first activity comprises performing first signal quality measurements of each single DMRS out of the set of single DMRS and reporting at least some of the first signal quality measurements to the wireless communications network, and the second activity comprises performing a second signal quality measurement of each dual DMRS out of the set of dual DMRS and reporting at least some of the second signal quality measurements to the wireless communications network.

According to another aspect of embodiments herein, the object is achieved by a wireless communication device for reporting signal quality measurements. The wireless communication device is operable in a wireless communications network and is adapted to comprise a first wireless network configured with single Demodulation Reference Signals, DMRS, and a second wireless network configured with dual DMRS. The wireless communication device is configured to:

receive a set of DMRS comprising one or more single DMRS from the first wireless network, and receive a set of dual DMRS comprising one or more dual DMRS from the second wireless network, based on the speed of the wireless communication device, select any one or more out of a first activity and a second activity.

The first activity comprises to perform first signal quality measurements of each single DMRS out of the set of single DMRS and report at least some of the first signal quality measurements to the wireless communications network, and the second activity comprises to perform a second signal quality measurement of each dual DMRS out of the set of dual DMRS and report at least some of the second signal quality measurements to the wireless communications network.

According to another aspect of embodiments herein, the object is achieved by a wireless communication device for reporting signal quality measurements. The wireless communication device is operable in a wireless communications network and is adapted to comprise a first wireless network configured with single Demodulation Reference Signals, DMRS, and a second wireless network configured with dual DMRS. The wireless communication device comprises:

A receiving module configured to receive a set of DMRS comprising one or more single DMRS from the first wireless network, a set of dual DMRS comprising one or more dual DMRS from the second wireless network.

A selecting module configured to, based on the speed of the wireless communication device, select any one or more out of the first activity and the second activity. The first activity comprising to perform first signal quality measurements of each single DMRS out of the set of single DMRS and report at least some of the first signal quality measurements to the wireless communications network, and the second activity comprising to perform a second signal quality measurement of each dual DMRS out of the set of dual DMRS and report at least some of the second signal quality measurements to the wireless communications network According to another aspect of embodiments herein, the object is achieved by a wireless communication device for reporting signal quality measurements, which wireless communication device is operable in a wireless communications network, which wireless communications network is adapted to comprise a first wireless network configured with single Demodulation Reference Signals, DMRS, and a second wireless network configured with dual DMRS, the wireless communication device comprising a processor and a memory containing instructions executable by the processor whereby the wireless communication device is configured to:

Receive a set of DMRS comprising one or more single DMRS from the first wireless network and a set of dual DMRS comprising one or more dual DMRS from the second wireless network.

Based on the speed of the wireless communication device, select any one or more out of a first activity and a second activity. The first activity comprising to perform first signal quality measurements of each single DMRS out of the set of single DMRS and report at least some of the first signal quality measurements to the wireless communications network, and the second activity comprising to perform a second signal quality measurement of each dual DMRS out of the set of dual DMRS and report at least some of the second signal quality measurements to the wireless communications network.

In this way the wireless communication device reports only those wireless networks configured with single and/or dual DMRS, which are optimal under its own environment. This will force the wireless communications network to select a serving network node such as serving base-station e.g. in a handover process of the wireless communication device, based on reported signal quality measurements only from the one wireless network which gives maximum resources under given conditions, or from both wireless networks only when it is needed.

An advantage with embodiments herein is that they provide wireless network selection performed by the wireless device, not only being based on signal quality parameters but also on the expected coherence time of a channel which is depending on the speed of the wireless device. This will result in optimal usage of resources and better utilization of spectrum.

This means that embodiments herein provide optimal network selection that will result in better resource utilization since the wireless communication device can select the wireless network that is most suited under given conditions which are a great advantage.

BRIEF DESCRIPTION OF DRAWINGS

Examples of embodiments herein are described in more detail with reference to attached drawings in which:

FIG. 1 is a schematic diagram illustrating prior art.

FIG. 2 is a schematic diagram illustrating prior art.

DETAILED DESCRIPTION

As part of developing embodiments herein, some problems with the state of the art communications networks will first be identified and discussed.

As mentioned above, in a mix of network operator configured schemes it is likely a wireless communication device can see, i.e. is in radio coverage of both single DMRS and dual DMRS. This would be prevalent in residential areas near expressway where the same wireless communication device can see, i.e. is in radio coverage of, multiple networks with different configurations. If the i.e. is in radio coverage of reports measurements of all visible base-stations' signals, then the wireless communication network would likely choose the base-station having best signal characteristic.

For static or for near-static wireless communication devices it would be wasteful if it chooses to report on a dual DMRS network since that would mean more unnecessary overhead.

Embodiments herein provide a scheme specifically suitable for static or near-static wireless communication devices for optimal network selection to report on.

Wireless communication devices such as e.g. Static or near-static wireless communication devices which are capable of receiving signals from both single and dual DMRS configured network shall not only look at the signal quality e.g. as measured by SINR, for selection of best serving base station, but also evaluate options resulting in gain in resources which may be used for information transmission instead of reference signaling thereby accomplishing more spectral efficiency.

The wireless communication device may calculates SINR for both networks and according to embodiments herein, decides based on its speed for single or dual DMRS configured network selection for reporting signal quality measurements on. This is for better utilization of the spectrum. This speed of the wireless communication device may in turn be statically configured as e.g. 0 for a wireless communication device being a CPE or may be measured dynamically by using other means available such as Global Positioning System (GPS), or Inertial Measurement Unit (IMU) e.g. an accelerometer or a combination of both. Thus the wireless communication device reports only a subset of visible base-station and forces the network to choose the one which would allow optimal usage of spectrum.

Figure 3:
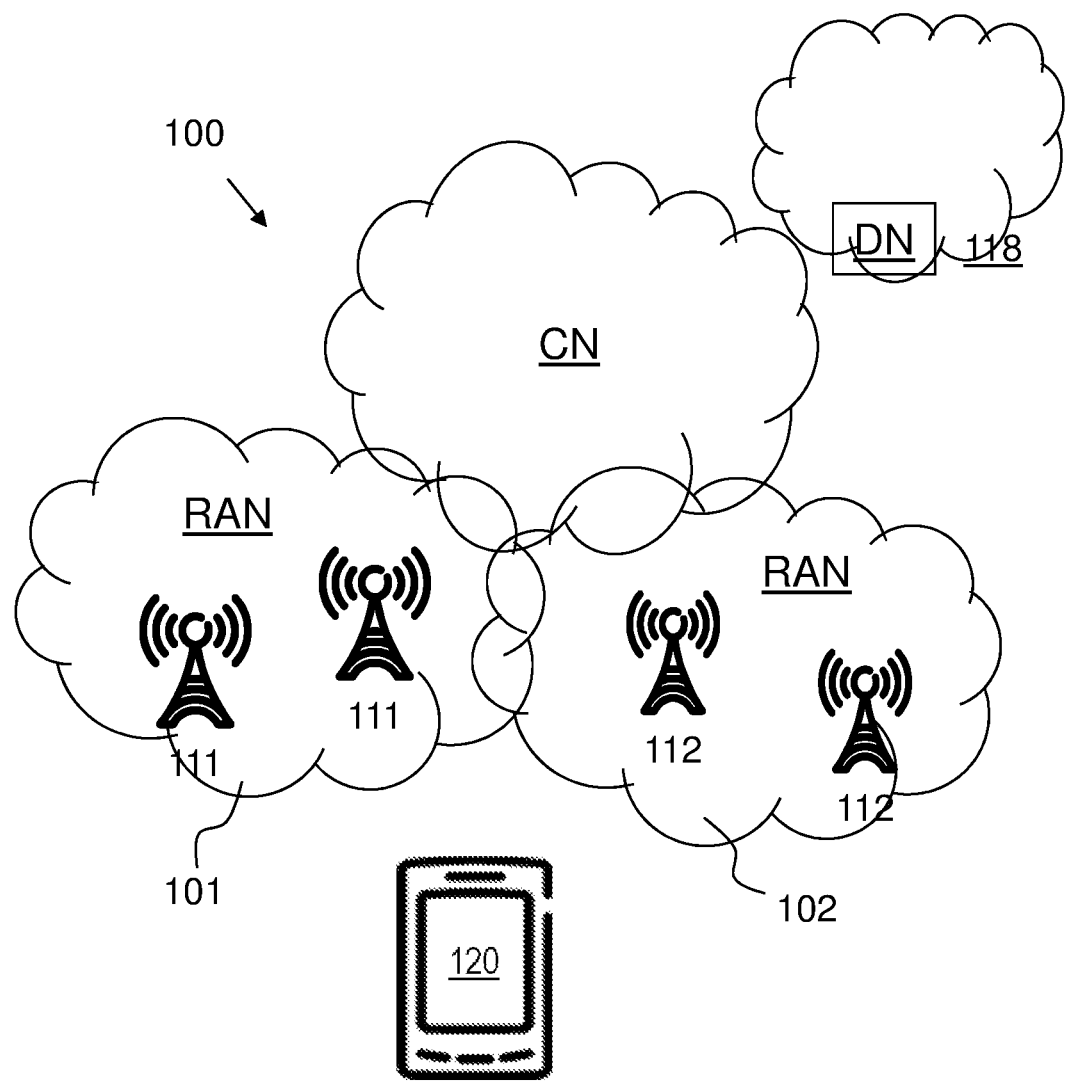
FIG. 3 is a schematic block diagram illustrating embodiments of a wireless communications network.

Embodiments herein relate to wireless communications networks in general. A wireless communications network 100 wherein embodiments herein may be implemented is schematically illustrated in FIG. 3. The wireless communications network 100 may use a number of different technologies, such as Wi-Fi, Long Term Evolution (LTE), LTE-Advanced, 5G, Wideband Code-Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

The wireless communications network 100 may thus be a cellular communications network such as a 5G network, an LTE network, a WCDMA network, a GSM network, any 3GPP cellular network, Wimax, or any other wireless communications network or system. Embodiments herein relate to recent technology trends that are of particular interest in a 5G context, however, embodiments are also applicable in further development of the existing Wireless Personal Area Network (WPAN) or Wireless Wide Area Network (WWAN) wireless communication systems such as e.g. WCDMA, Wi-Fi, Licensed Assisted Access (LAA), LTE in Unlicensed spectrum (LTE-U), and LTE.

The wireless communication network 100 comprises Radio Access Networks (RANs), and one or more Core Networks (CNs). The wireless communication network 100 such as the RANs of the wireless communication network 100 comprises a first wireless network 101 and a second wireless network 102. The first wireless network 101 is configured with single DMRS and the second wireless network 102 is configured with dual DMRS. The first wireless network 101 may belong to the same operator or a different operator as the second wireless network 102.

A number of first network nodes 111 operate in the first wireless network 101. The first network nodes 111 are configured to operate in the first wireless network 101, and are configured with single DMRS.

A number of second network nodes 112 operate in the second wireless network 102. The second network nodes 112 are configured to operate in the second wireless network 102 and are configured with dual DMRS.

The first and second network nodes 111, 112 each provides radio coverage over a geographical area, also referred to as a service area, which may also be referred to as a cell, a cluster, a beam or a beam group, of a Radio Access Technology (RAT), such as 5G, LTE, Wi-Fi or similar. The first and second network nodes 111, 112 may each be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless communication device within the service area served by the respective first and second network nodes 111, 112 depending e.g. on the first radio access technology and terminology used. The first and second network nodes 111, 112 may be referred to as serving radio network nodes and communicate with a wireless communication device with Downlink (DL) transmissions to the wireless communication device and Uplink (UL) transmissions from the wireless communication device.

In this disclosure, a service area is sometimes referred to as a coverage area, a cell or a cluster wherein the respective first and second network nodes 111, 112 provides radio coverage.

A wireless communication device 120 operates in the wireless communications network 100. The wireless communication device 120 may be a UE, a mobile station, a non-access point (non-AP) STA, a STA, a user equipment and/or a wireless terminals, communicate via one or more Access Networks (AN), e.g. RAN, to one or more core networks (CN). It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell. The embodiments herein are specifically suitable for the wireless communication device 120 being a static or near-static UEs or CPE, i.e. wherein the speed of the wireless communication device 120 is close to zero.

It should be understood by the person skilled in the art that "wireless communication device" is a non-limiting term which means any terminal, communications device, wireless communication terminal, user equipment, CPE, Machine-Type Communication (MTC) device, Machine-to-Machine (M2M) device, Device-to-Device (D2D) terminal, or node e.g. smart phone, computer, laptop, mobile phone, sensor, relay, mobile tablets, an Internet-of-Things (IoT) device, e.g. a Cellular IoT (CIoT) device or even a small base station communicating within a service area.

The wireless communication device 120 operate in the wireless communications network 100 is capable of such as configured to report signal quality measurements performed on any one or more out of the first and second network nodes 111, 112, when being in radio coverage of said one or more out of the first and second network nodes 111, 112. According to an example scenario, the wireless communication device 120 is in a zone where it may choose between a single DMRS network such as the first wireless network 101, or a dual DMRS network such as the second wireless network 102.

According to embodiments herein, wireless network selection performed by the wireless device 120, is not only based on RSRP, RSRQ or other signal quality parameter but also on the expected coherence time of a channel which is depending on the speed of the wireless device 120. This will result in optimal usage of resources and better utilization of spectrum.

Figure 4:
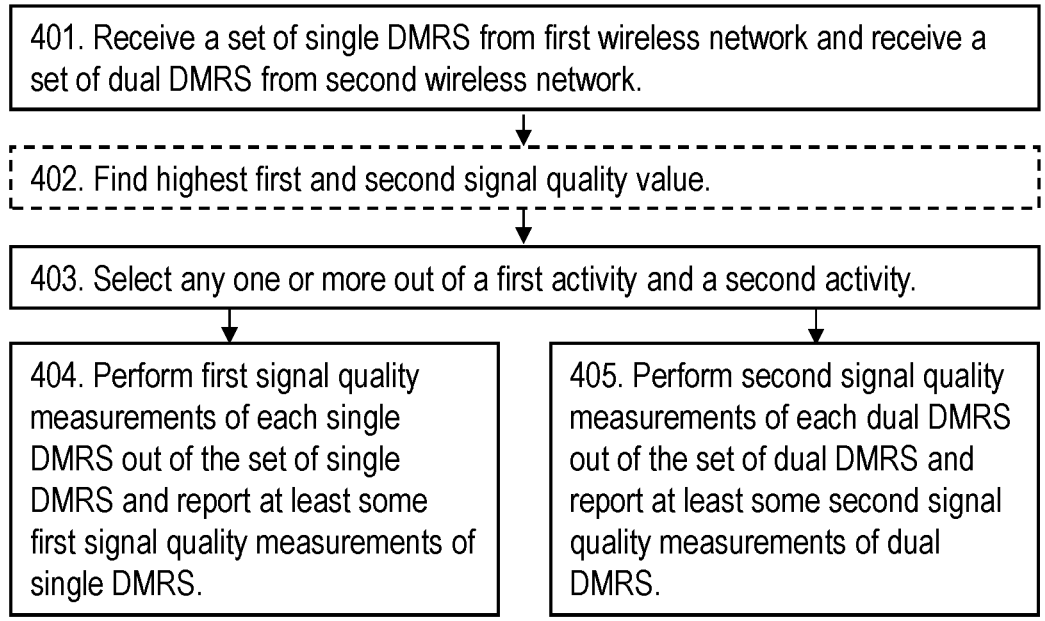
FIG. 4 is a flowchart depicting illustrating embodiments of a method in a wireless communication device.

Example embodiments of a method performed by the wireless communication device 120 for reporting signal quality measurements will be described with reference to a flowchart depicted in FIG. 4. As mentioned above, the wireless communication device 120 operates in the wireless communications network 100. The wireless communications network 100 comprises the first wireless network 101 configured with single DMRS and the second wireless network 102 configured with dual DMRS.

The method comprises the following actions, which actions may be taken in any suitable order. Some actions may also be combined. Actions that are optional are presented in dashed boxes in FIG. 4. Thus one or more of the actions may be optional. It should be understood that the actions may be taken in any suitable order. In an example scenario, the wireless communications network 100 needs to find a suitable serving network node 111, 112 e.g. in a handover process. The wireless communications network 100 must therefore check the signal quality of candidate network nodes in visible first and second wireless networks 101, 102 from transmitted DMRS. It shall be noted that even though the examples herein refer to one first wireless network 101 and one second wireless network 102, also more than one first wireless network 101 and more than one second wireless networks 102 are as well applicable to the embodiments herein.

Action 400

The wireless communication device 120 receives a set of single DMRS comprising one or more single DMRS from the first wireless network 101, and a set of dual DMRS comprising one or more dual DMRS from the second wireless network 102.

Action 401

In some embodiments, the wireless communication device 120 may perform both first signal quality measurements of each single DMRS out of the set of single DMRS and second signal quality measurements of each dual DMRS out of the set of dual DMRS. In some other embodiments, only one of the measurements is performed depending on selected first activity and/or second activity. See Action 403 below.

Action 402

In the embodiments where Action 401 has been performed, the wireless communication device 120 finds a first signal quality value being highest among the results of the performed first signal quality measurements of the set of single DMRS, and finds a second signal quality value being highest among the results of the performed second signal quality measurements of the set of dual DMRS. The first signal quality value is in some embodiments is referred to as $S_S$max and the second signal quality value is in some embodiments is referred to as $S_D$max.

These findings may be used for a more suitable selection in Action 403 below according to some embodiments. This Action may be performed by the wireless communication network 100.

Action 403

The wireless communication device 120 is aware of its speed. The speed of the wireless communication device 120 may be statically configured as e.g. 0 for a wireless communication device 120 being a CPE or may be measured dynamically by using other means available such as GPS, or IMU e.g. an accelerometer or a combination of both.

To improve the performance of the wireless communications network 100 according to embodiments herein, e.g. by better utilization of the spectrum, the wireless communication device 120 selects any one or more out of a first activity and a second activity, based on the speed of the wireless communication device 120. The first activity relates to measuring and reporting measurements on single DMRS described in Action 404 below and the second activity relates measuring and reporting measurements on dual DMRS to Action 405 below.

In some embodiments wherein the highest first and second signal quality value was found, see Action 402 above, the selecting of any one or more out of the first activity and the second activity may further be based on a difference between the first signal quality value and the second signal quality value also referred to as $S_S$max and $S_D$max.

In some embodiments, the selecting of any one or more out of a first activity and a second activity based on the speed of the wireless communication device 120 may comprise: When the speed is below a first speed threshold value, acting according to the first activity related to the single DMRS, when the speed is above a second speed threshold value, acting according to the second activity related to the dual DMRS, and when the speed is between the first speed threshold value and the second speed threshold value, acting according to both the first activity related to the single DMRS and the second activity related to the dual DMRS.

In these embodiments, the second speed threshold value is equal or larger than the first speed threshold value. In an example scenario, wherein the wireless communication device 120 is static or for near-static, i.e. when the speed is very low, it would be wasteful if it chooses to report on a dual DMRS network since that would mean more unnecessary overhead. In this example scenario it is therefore suitable to select the first activity relating to reporting measurements on single DMRS.

The following relates to embodiments where Action 402 have been performed by finding the first signal quality value which in some embodiments is referred to as $S_S$max and the second signal quality value, which in some embodiments is referred to as $S_D$max. The selecting of any one or more out of a first activity and a second activity based on the speed of the wireless communication device 120 may in some embodiments comprise:

When the speed is below the first speed threshold value and when further the second signal quality value minus the first signal quality value is below a predetermined value, acting according to the first activity related to the set of single DMRS, and when the speed is below the first speed threshold value and when further the second signal quality value minus the first signal quality value is above the predetermined value, acting according to both the first activity related to the set of single DMRS and the second activity related to the set of dual DMRS.

The selecting of any one or more out of a first activity and a second activity based on the speed of the wireless communication device 120 may in some alternative embodiments comprise:

When the speed is above the second speed threshold value and when further the first signal quality value minus the second signal quality value is below a predetermined value, acting according to the second activity related to the set of dual DMRS, and when the speed is above the second speed threshold value and when further the first signal quality value minus the second signal quality value is above the predetermined value, acting according to both the first activity related to the set of single DMRS and the second activity related to the set of dual DMRS.

This will be further exemplified below.

Action 404

This Action relates to the first Activity.

As mentioned above, the wireless communication device 120 has performed first signal quality measurements of each single DMRS out of the set of single DMRS.

In the first activity, the wireless communication device 120 performs first signal quality measurements of each single DMRS out of the set of single DMRS. This may be performed in Action 401 in some embodiments or in this action according to some other embodiments.

In the first activity, the wireless communication device 120 further reports at least some of the first signal quality measurements to the wireless communications network 100.

Action 405

This Action relates to the second Activity.

As mentioned above, the wireless communication device 120 has performed second signal quality measurements of each dual DMRS out of the set of dual DMRS. In the second activity, the wireless communication device 120 performs a second signal quality measurement of each dual DMRS out of the set of dual DMRS. This may be performed in Action 401 in some embodiments or in this action according to some other embodiments.

In the second activity, the wireless communication device 120 further reports at least some of the second signal quality measurements to the wireless communications network 100.

The method herein may be seen as selecting which wireless network to report measurements on. Thus in some embodiments, the selecting of any one or more out of the first activity and the second activity comprises selecting to report signal quality measurements on any one or more out of the first wireless network 101 and the second wireless network 102. In these embodiments, the acting according to the first activity is performed when the first wireless network 101 is selected to report signal quality measurements on. The acting according to the second activity is performed when the second wireless network 102 is selected to report signal quality measurements on.

Further, the acting according to both the first activity and to the second activity is performed when both the first wireless network 101 and the second wireless network 102 are selected to report signal quality measurements on.

The reported signal quality measurements will be used by a wireless communication network 100 to select the best serving network node 111, 112 such as serving base-station based on reported signal strength and available capacity of visible base-stations.

Embodiment's herein will now be further described and explained. The examples described below are applicable to and may be combined with any suitable embodiment described above.

As mentioned above, wireless communication device 120 will perform first signal quality measurements of each single DMRS out of the set of single DMRS and second signal quality measurements of each dual DMRS out of the set of dual DMRS. This may be performed by measure the SINR for each single and dual DMRS from the first and second wireless network 101, 102 and use its own speed. An algorithm for a network selection process 500 according to an example embodiment herein, to select any one or more out of the first wireless network 101 and the second wireless network 102 may be performed as shown in an example flowchart of FIG. 5, wherein Yes is referred to as Y and No is referred to as N.

When the first and second wireless network 101, 102 are visible 501, the wireless communication device 120 obtains 502 information about its speed, and compares 503 the speed with a first speed threshold value $V_0$.

When the speed of the wireless communication device 120 is below a first speed threshold value $V_0$, acting according to the first activity by performing 504 a first signal quality measurements of each visible single DMRS out of the set of single DMRS and report 505 only at least some of the first signal quality measurements to the wireless communications network 100.

When the speed of the wireless communication device 120 is equal or above the first speed threshold value $V_0$, the wireless communication device 120 compares 506 the speed with a second speed threshold value $V_1$.

When the speed of the wireless communication device 120 is above a second speed threshold value $V_1$, acting according to the second activity by performing 507 second signal quality measurements of each visible dual DMRS out of the set of dual DMRS and report 508 only at least some of the second signal quality measurements to the wireless communications network 100.

When the speed of the wireless communication device 120 is below or equal the second speed threshold value $V_1$, that is between first speed threshold value $V_0$ and second speed threshold value $V_1$, acting according to both the first activity and the second activity by performing 509 first signal quality measurements of each visible single DMRS out of the set of single DMRS and second signal quality measurements of each visible dual DMRS out of the set of dual DMRS and report 510 both at least some of the first signal quality measurements to the wireless communications network 100 and at least some of the second signal quality measurements to the wireless communications network 100.

When both the first and second wireless network 101, 102 are not visible 501, the wireless communication device 120 measures and reports 511 signal quality for the wireless network 101, 102 being visible.

The first speed threshold value $V_0$ and the second speed threshold value $V_1$ may e.g. be configurable threshold values. The threshold values $V_0$ and $V_1$ may be set to optimize the selection of wireless network to report on, these values may be specific to manufacturer depending on the receiver sensitivity under different conditions, e.g. referred to as primarily speed. One suitable example is $V_0$=3 km per hour (kmph) and $V_1$=60 kmph where the wireless communication device 120 is almost static but in highly dynamic urban environment, other example may be $V_0$=50 km per hour (kmph) and $V_1$=80 kmph for cases where the wireless communication device 120 easily can tolerate high speeds and still can maintain good sensitivity.

Figure 5:
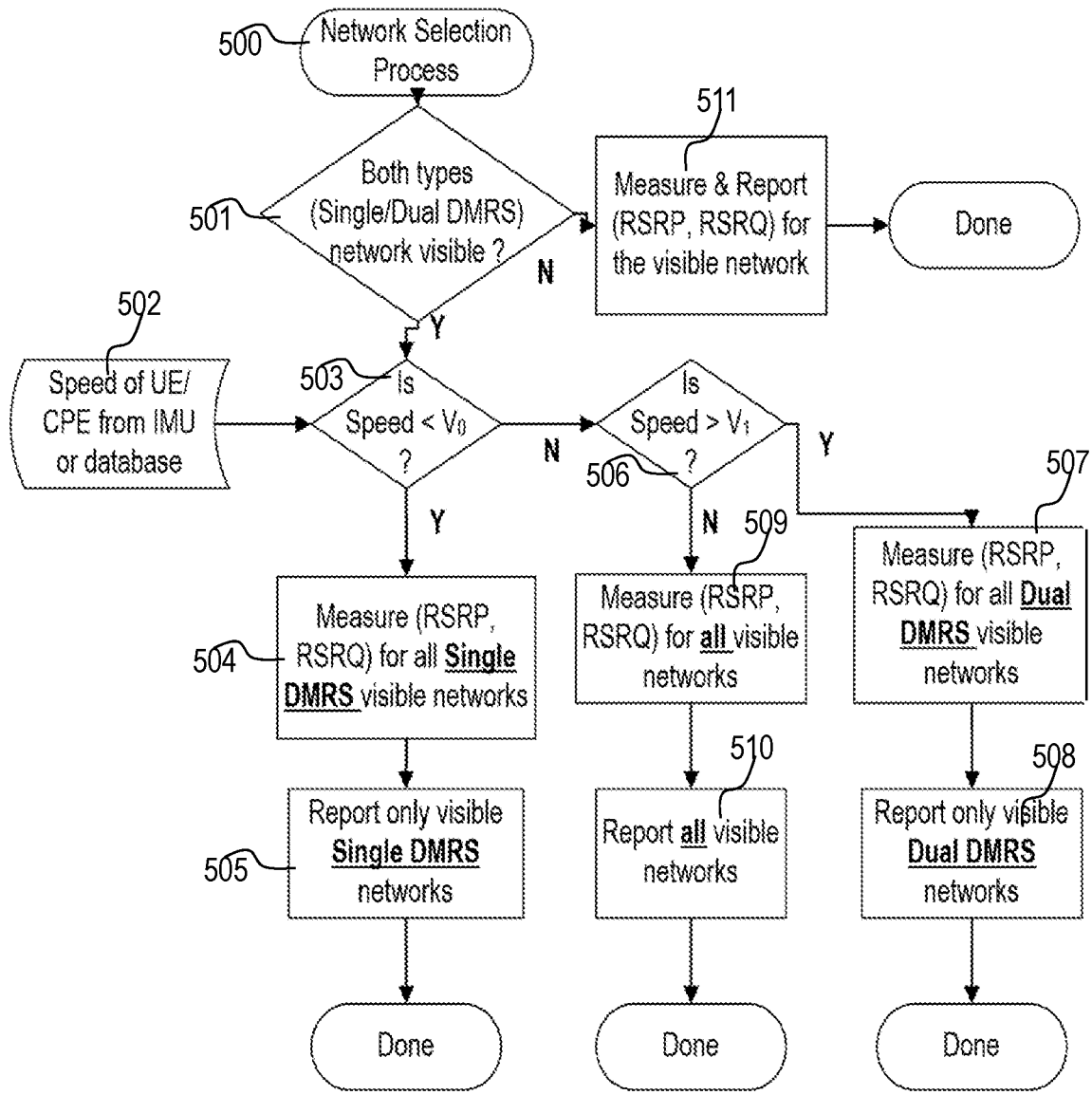
FIG. 5 is a flowchart depicting illustrating embodiments of a method in a wireless communication device.

The flowchart in FIG. 5 shows that the main inputs to the process of selecting a wireless network to report on are speed of the wireless communication device 120 which may be zero for the wireless communication device 120 being a CPE, and the number of wireless networks visible and whether they are configured with dual or single DMRS. The wireless communication device 120 reports only those network nodes such as base-stations which are optimal under its own environment, thus forcing the wireless communications network 100 to select a serving network node 111, 112 such as serving base-station e.g. in a handover process of the wireless communication device 120, based on reported signal quality measurements only from the one which gives maximum resources under given conditions.

Figure 6:
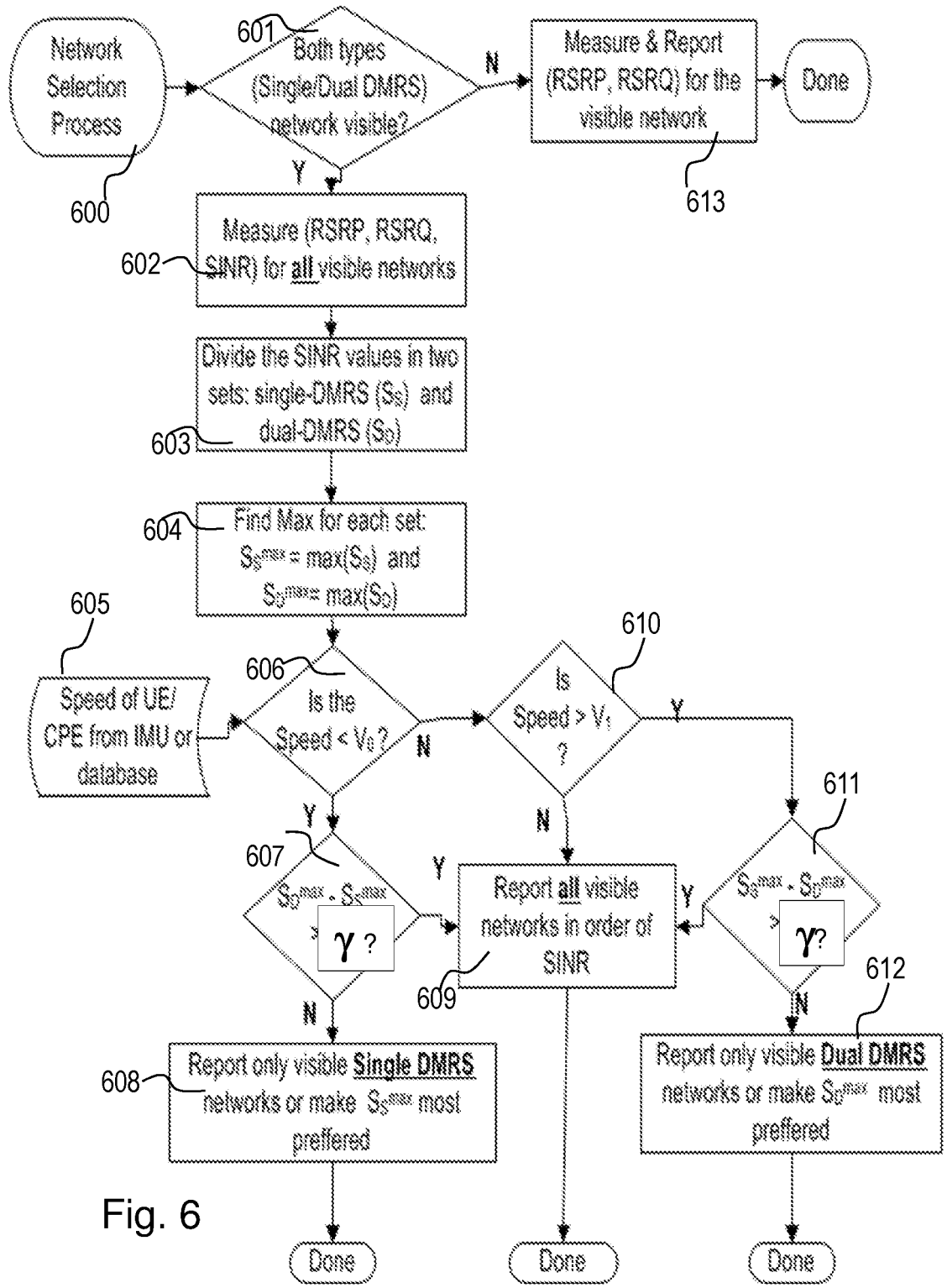
FIG. 6 is a flowchart depicting illustrating embodiments of a method in a wireless communication device.

In yet another more involved selection method according to embodiments herein depicted in is depicted in FIG. 6 where signal quality measurement such as the SINR or any other metric is biased as per the current status in terms of speed of the wireless communication device 120 with some threshold γ such as e.g. 3 dB, for an alternative of selecting to report on the first wireless network 101 associated with single DMRS or to report on the second wireless network 102 associated with dual DMRS, or both. In these embodiments of the method the wireless communication device 120 may still report all the visible network nodes 111, 112 such as base-stations of the selected wireless network 101, 102 but may bias the most preferred one with certain additional value so that the wireless communications network 100 is forced to handover to a certain network node 111, 112 such as base-station or give first priority to it.

An algorithm for a network selection process 600 according to these example embodiment, comprising to select any one or more out of the first wireless network 101 and the second wireless network 102 to report on depending on speed and signal quality measurement such as the SINR or any other metric with a certain threshold γ may be performed as shown in an example flowchart of FIG. 6, wherein Yes is referred to as Y and No is referred to as N.

When the first and second wireless network 101, 102 are visible 601, the wireless communication device 120 measures 602 signal quality such as the SINR or any other metric of all the visible first and second wireless network 101, 102. The wireless communication device 120 then divides 603 the measurement values into two sets: One set of first signal quality measurements relating to signal quality of the first wireless network 101 configured with single DMRS, and one set of second signal quality measurements relating to signal quality of the second wireless network 102 configured with dual DMRS. The wireless communication device 120 then finds 604 a first signal quality value $S_S$max being highest among the results of the performed first signal quality measurements of the set of single DMRS. The wireless communication device 120 further finds a second signal quality value $S_D$max being highest among the results of the performed second signal quality measurements of the set of dual DMRS.

The wireless communication device 120 then obtains 605 information about its speed, and compares 606 the speed with a first speed threshold value $V_0$.

When the speed of the wireless communication device 120 is below the first speed threshold value $V_0$, the wireless communication device 120 compares 607 $S_D$max with $S_S$max:

When the second signal quality value $S_D$max minus the first signal quality value $S_S$max is below or equal than a predetermined value, which in the example is the threshold γ, the wireless communication device 120 acts 608 according to the first activity by reporting only at least some of the first signal quality measurements relating to signal DMRS to the wireless communications network 100.

When the second signal quality value $S_D$max minus the first signal quality value $S_S$max is above the predetermined value, which in the example is the threshold γ, the wireless communication device 120 acts 609 according to both the first activity by reporting at least some of the first signal quality measurements relating to single DMRS to the wireless communications network 100 and the second activity by reporting at least some of the second signal quality measurements, relating to dual DMRS, to the wireless communications network 100.

When the speed of the wireless communication device 120 is equal or above the first speed threshold value $V_0$, the wireless communication device 120 compares 610 the speed with a second speed threshold value $V_1$.

When the speed of the wireless communication device 120 is below the second speed threshold value $V_1$, the wireless communication device 120 acts 609 according to both the first activity by reporting at least some of the first signal quality measurements relating to single DMRS to the wireless communications network 100 and the second activity by reporting at least some of the second signal quality measurements, relating to dual DMRS, to the wireless communications network 100.

When the speed of the wireless communication device 120 is above the second speed threshold value $V_1$, the wireless communication device 120 compares 611 $S_S$max with $S_D$max:

When the first signal quality value $S_S$max minus the second signal quality value $S_D$max is below or equal than a predetermined value, which in the example is the threshold γ, the wireless communication device 120 acts 612 according to the second activity by reporting only at least some of the second signal quality measurements relating to dual DMRS to the wireless communications network 100.

When the first signal quality value $S_S$max minus the second signal quality value $S_D$max is above the predetermined value, which in the example is the threshold γ, the wireless communication device 120 acts 609 according to both the first activity by reporting at least some of the first signal quality measurements relating to single DMRS to the wireless communications network 100 and the second activity by reporting at least some of the second signal quality measurements, relating to dual DMRS, to the wireless communications network 100.

When only one of the first and second wireless network 101, 102 are visible 601, the wireless communication device 120 measures and reports 613 signal quality for the wireless network 101, 102 being visible.

In some embodiments, the wireless communication device 120 comprises an input and output interface 700 configured to communicate with one or more the wireless devices, and one or more network nodes, e.g. the first network nodes 111 or second network nodes 112 (not shown). The input and output interface 700 may comprise a wireless receiver (not shown) and a wireless transmitter (not shown).

Figure 7:
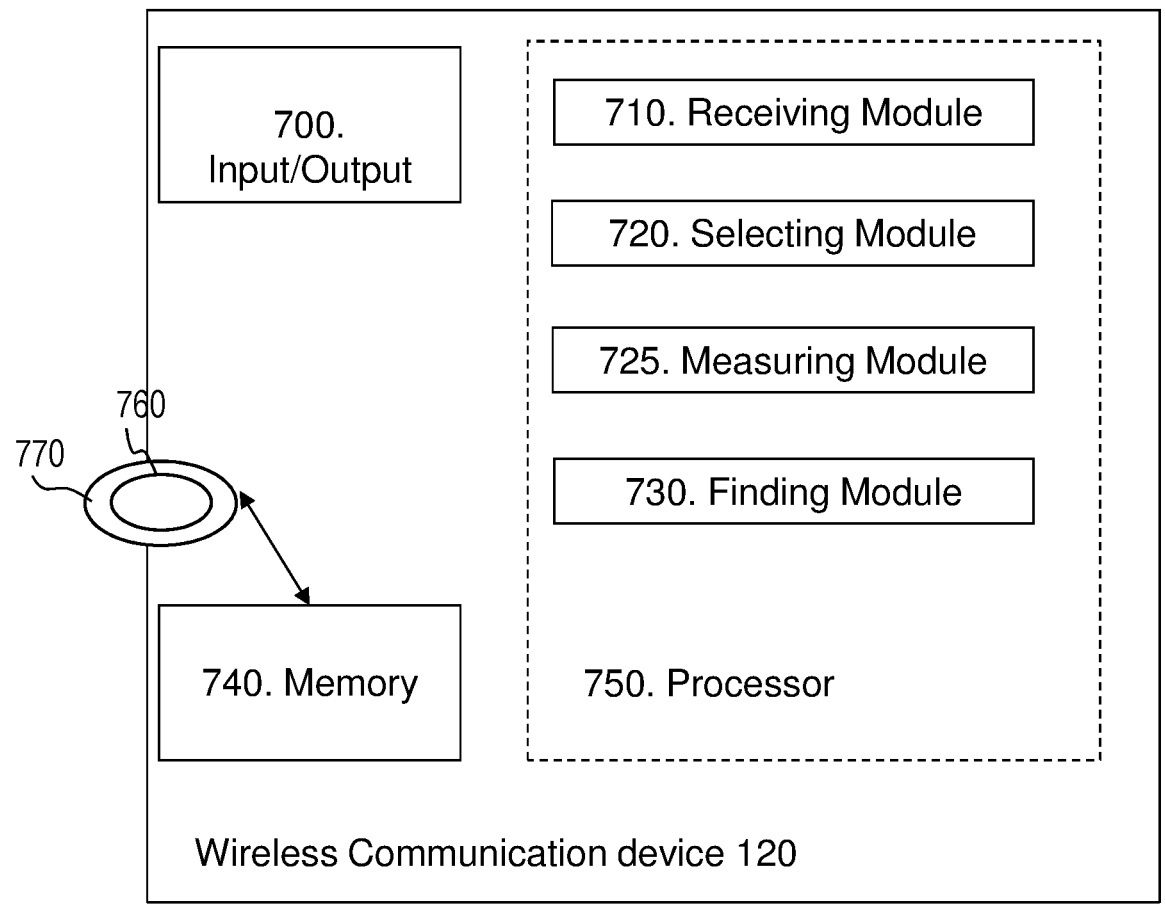
FIG. 7 is a schematic block diagram illustrating embodiments of a wireless communication device.

To perform the method actions for reporting signal quality measurements, the wireless communication device 120, may comprise the following arrangement depicted in FIG. 7. As mentioned above, the wireless communication device 120 is operable in the wireless communications network 100. The wireless communications network 100 is adapted to comprise a first wireless network 101 configured with single DMRS, and a second wireless network 102 configured with dual DMRS.

The wireless communication device 120 is configured to, e.g. by means of a receiving module 710 configured to, receive a set of DMRS comprising one or more single DMRS from the first wireless network 101, and a set of dual DMRS comprising one or more dual DMRS from the second wireless network 102.

The wireless communication device 120 is further configured to, e.g. by means of a selecting module 720 configured to, based on the speed of the wireless communication device 120, select any one or more out of the first activity and the second activity. The first activity comprises to perform first signal quality measurements of each single DMRS out of the set of single DMRS and report at least some of the first signal quality measurements to the wireless communications network 100. The second activity comprises to perform a second signal quality measurement of each dual DMRS out of the set of dual DMRS and report at least some of the second signal quality measurements to the wireless communications network 100.

The selection of any one or more out of the first activity and the second activity based on the speed of the wireless communication device 120 to be performed by the configured selecting module 720 may in some embodiments comprise: When the speed is below a first speed threshold value, acting according to the first activity related to the single DMRS, when the speed is above a second speed threshold value, acting according to the second activity related to the dual DMRS, and when the speed is between the first speed threshold value and the second speed threshold value, acting according to both the first activity related to the single DMRS and the second activity related to the dual DMRS. In these embodiments, the second speed threshold value is equal or larger than the first speed threshold value.

The wireless communication device 120 may further be configured to, e.g. by means of a measuring module 725 configured to configured to, perform a first signal quality measurements of each single DMRS out of the set of single DMRS and a second signal quality measurements of each dual DMRS out of the set of dual DMRS.

In some embodiments, the wireless communication device 120 is further configured to, e.g. by means of a finding module 730 configured to, find a first signal quality value being highest among the results of the performed first signal quality measurements of the set of single DMRS, and find a second signal quality value being highest among the results of the performed second signal quality measurements of the set of dual DMRS. In these embodiments, the wireless communication device 120 is further configured to, e.g. by means of the selecting module 720 further is configured to, select any one or more out of the first activity and the second activity based on the speed of the wireless communication device 120 and further based on the difference between the first signal quality value and the second signal quality value.

According to an example scenario, the selection of any one or more out of the first activity and the second activity based on the speed of the wireless communication device 120 to be performed by the configured wireless communication device 120, such as e.g. by the configured selecting module 720 comprises: When the speed is below the first speed threshold value and when further the second signal quality value minus the first signal quality value is below a predetermined value, act according to the first activity related to the set of single DMRS, and when the speed is below the first speed threshold value and when further the second signal quality value minus the first signal quality value is above the predetermined value, act according to both the first activity related to the set of single DMRS and the second activity related to the set of dual DMRS.

According to another example scenario, the selection of any one or more out of the first activity and the second activity based on the speed of the wireless communication device 120 to be performed by the configured wireless communication device 120, such as e.g. by the configured selecting module 720 comprises: When the speed is above the second speed threshold value and when further the first signal quality value minus the second signal quality value is below a predetermined value, act according to the second activity related to the set of dual DMRS, and when the speed is above the second speed threshold value and when further the first signal quality value minus the second signal quality value is above the predetermined value, act according to both the first activity related to the set of single DMRS and the second activity related to the set of dual DMRS.

In some embodiments, the selection of any one or more out of the first activity and the second activity based on the speed of the wireless communication device 120 to be performed by the configured wireless communication device 120, such as e.g. by the configured selecting module 720 comprises: Select to report signal quality measurements on any one or more out of the first wireless network 101 and the second wireless network 102. In these embodiments, the action according to the first activity is performed when the first wireless network 101 is selected to report signal quality measurements on, the action according to the second activity is performed when the second wireless network 102 is selected to report signal quality measurements on, and wherein the action according to both the first activity and to the second activity is performed when both the first wireless network 101 and the second wireless network 102 are selected to report signal quality measurements on.

The wireless communication device 120 may also comprise means for storing data. In some embodiments, the wireless communication device 120 comprises a memory 740 configured to store the data. The data may be processed or non-processed data and/or information relating thereto. The memory 740 may comprise one or more memory units. Further, the memory 740 may be a computer data storage or a semiconductor memory such as a computer memory, a read-only memory, a volatile memory or a non-volatile memory. The memory 740 is arranged to be used to store obtained information, data, configurations, schedulings, and applications etc. to perform the methods herein when being executed in the wireless communication device 120.

Embodiments herein for reporting signal quality measurements may be implemented through one or more processors, such as the processor 750 in the wireless communication device 120 depicted in FIG. 7, together with computer program code such as a computer program 760 for performing the functions and/or method actions of embodiments herein. The program code mentioned above may also be provided as a computer program product, for instance in the form of a data carrier such as a carrier 770 carrying computer program code for performing the embodiments herein when being loaded into the wireless communication device 120. One such carrier may be in the form of an electronic signal, an optical signal, an electromagnetic signal, a magnetic signal, an electric signal, a radio signal, a microwave signal, or a computer-readable storage medium. The computer-readable storage medium may be a CD ROM disc or a memory stick.

The computer program code may furthermore be provided as program code stored on a server and downloaded to the wireless communication device 120.

Those skilled in the art will also appreciate that the input/output interface 700, the modules above may refer to a combination of analog and digital circuits, and/or one or more processors configured with software and/or firmware, e.g. stored in the memory 740, that when executed by the one or more processors such as the processors in the wireless communication device 120 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

When using the word "comprise" or "comprising" it shall be interpreted as non-limiting, i.e. meaning "consist at least of".

Modifications and other variants of the described embodiment(s) will come to mind to one skilled in the art having the benefit of teachings presented in the foregoing descriptions and the associated drawings. Therefore, it is to be understood that the embodiment(s) herein is/are not be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method performed by a wireless communication device for reporting signal quality measurements, which wireless communication device operates in a wireless communications network, which wireless communications network comprises a first wireless network configured with single Demodulation Reference Signals (DMRS) and a second wireless network configured with dual DMRS, the method comprising:
receiving a set of DMRS comprising one or more single DMRS from the first wireless network, and a set of dual DMRS comprising one or more dual DMRS from the second wireless network,
based on the speed of the wireless communication device, selecting any one or more out of a first activity and a second activity, wherein:
the first activity comprises performing first signal quality measurements of each single DMRS out of the set of single DMRS and reporting at least some of the first signal quality measurements to the wireless communications network, and
the second activity comprises performing a second signal quality measurement of each dual DMRS out of the set of dual DMRS and reporting at least some of the second signal quality measurements to the wireless communications network.

2. The method according to claim 1, wherein the selecting any one or more out of the first activity and the second activity based on the speed of the wireless communication device comprises,
when the speed is below a first speed threshold value, acting according to the first activity related to the single DMRS,
when the speed is above a second speed threshold value, acting according to the second activity related to the dual DMRS, and
when the speed is between the first speed threshold value and the second speed threshold value, acting according to both the first activity related to the single DMRS and the second activity related to the dual DMRS,
wherein the second speed threshold value is equal or larger than the first speed threshold value.

3. The method according to claim 1, further comprising:
performing a first signal quality measurements of each single DMRS out of the set of single DMRS and a second signal quality measurements of each dual DMRS out of the set of dual DMRS, and
finding a first signal quality value being highest among the results of the performed first signal quality measurements of the set of single DMRS, and
finding a second signal quality value being highest among the results of the performed second signal quality measurements of the set of dual DMRS,
wherein selecting any one or more out of the first activity and the second activity further is based on the difference between the first signal quality value and the second signal quality value.

4. The method according to claim 3, wherein the selecting any one or more out of the first activity and the second activity based on the speed of the wireless communication device comprises,
when the speed is below a first speed threshold value and when further the second signal quality value minus the first signal quality value is below a predetermined value, acting according to the first activity related to the set of single DMRS,
when the speed is below the first speed threshold value and when further the second signal quality value minus the first signal quality value is above the predetermined value, acting according to both the first activity related to the set of single DMRS and the second activity related to the set of dual DMRS.

5. The method according to claim 3, wherein the selecting any one or more out of the first activity and the second activity based on the speed of the wireless communication device comprises,
when the speed is above a second speed threshold value and when further the first signal quality value minus the second signal quality value is below a predetermined value, acting according to the second activity related to the set of dual DMRS, and
when the speed is above the second speed threshold value and when further the first signal quality value minus the second signal quality value is above the predetermined value, acting according to both the first activity related to the set of single DMRS and the second activity related to the set of dual DMRS.

6. The method according to claim 1, wherein selecting any one or more out of the first activity and the second activity comprises selecting to report signal quality measurements on any one or more out of the first wireless network and the second wireless network, and wherein,
the acting according to the first activity is performed when the first wireless network is selected to report signal quality measurements on,
the acting according to the second activity is performed when the second wireless network is selected to report signal quality measurements on, and wherein
the acting according to both the first activity and to the second activity is performed when both the first wireless network and the second wireless network are selected to report signal quality measurements on.

7. A computer program product comprising a non-transitory computer readable medium storing instructions, which when executed by a processor, cause the processor to perform actions according to claim 1.

8. A wireless communication device for reporting signal quality measurements, which wireless communication device is operable in a wireless communications network, which wireless communications network is adapted to comprise a first wireless network configured with single Demodulation Reference Signals (DMRS) and a second wireless network configured with dual DMRS, the wireless communication device comprising a processor and a memory containing instructions executable by the processor whereby the wireless communication device is configured to:

receive a set of DMRS comprising one or more single DMRS from the first wireless network, and
receive a set of dual DMRS comprising one or more dual DMRS from the second wireless network,
based on the speed of the wireless communication device, select any one or more out of a first activity and a second activity, wherein:
the first activity comprises to perform first signal quality measurements of each single DMRS out of the set of single DMRS and report at least some of the first signal quality measurements to the wireless communications network, and
the second activity comprises to perform a second signal quality measurement of each dual DMRS out of the set of dual DMRS and report at least some of the second signal quality measurements to the wireless communications network.

9. The wireless communication device according to claim 8, wherein the selection of any one or more out of the first activity and the second activity based on the speed of the wireless communication device to be performed comprises:
when the speed is below a first speed threshold value, acting according to the first activity related to the single DMRS,
when the speed is above a second speed threshold value, acting according to the second activity related to the dual DMRS, and
when the speed is between the first speed threshold value and the second speed threshold value, acting according to both the first activity related to the single DMRS and the second activity related to the dual DMRS,
wherein the second speed threshold value is equal or larger than the first speed threshold value.

10. The wireless communication device according to claim 8, wherein the wireless communication device further is configured to:
perform a first signal quality measurements of each single DMRS out of the set of single DMRS and a second signal quality measurements of each dual DMRS out of the set of dual DMRS, and
find a first signal quality value being highest among the results of the performed first signal quality measurements of the set of single DMRS, and
find a second signal quality value being highest among the results of the performed second signal quality measurements of the set of dual DMRS,
wherein the selection of any one or more out of the first activity and the second activity based on the speed of the wireless communication device to be performed, further is based on the difference between the first signal quality value and the second signal quality value.

11. The wireless communication device according to claim 10, wherein the selection of any one or more out of the first activity and the second activity based on the speed of the wireless communication device to be performed comprises:
when the speed is below a first speed threshold value and when further the second signal quality value minus the first signal quality value is below a predetermined value, act according to the first activity related to the set of single DMRS,
when the speed is below the first speed threshold value and when further the second signal quality value minus the first signal quality value is above the predetermined value, act according to both the first activity related to the set of single DMRS and the second activity related to the set of dual DMRS.

12. The wireless communication device according to claim 10, wherein the selection of any one or more out of the first activity and the second activity based on the speed of the wireless communication device to be performed comprises:
when the speed is above a second speed threshold value and when further the first signal quality value minus the second signal quality value is below a predetermined value, act according to the second activity related to the set of dual DMRS, and
when the speed is above the second speed threshold value and when further the first signal quality value minus the second signal quality value is above the predetermined value, act according to both the first activity related to the set of single DMRS and the second activity related to the set of dual DMRS.

13. The wireless communication device according to claim 8, wherein the selection to be performed comprises: select to report signal quality measurements on any one or more out of the first wireless network and the second wireless network, and wherein,
the action according to the first activity is performed when the first wireless network is selected to report signal quality measurements on,
the action according to the second activity is performed when the second wireless network is selected to report signal quality measurements on, and wherein
the action according to both the first activity and to the second activity is performed when both the first wireless network and the second wireless network are selected to report signal quality measurements on.

14. A wireless communication device for reporting signal quality measurements, which wireless communication device is operable in a wireless communications network, which wireless communications network is adapted to comprise a first wireless network configured with single Demodulation Reference Signals, DMRS, (DMRS) and a second wireless network configured with dual DMRS, the wireless communication device comprising a processor and a memory containing instructions executable by the processor whereby the wireless communication device is configured to:
receive a set of DMRS comprising one or more single DMRS from the first wireless network and
receive a set of dual DMRS comprising one or more dual DMRS from the second wireless network, and
based on the speed of the wireless communication device, select any one or more out of a first activity and a second activity, wherein:
the first activity comprising to perform first signal quality measurements of each single DMRS out of the set of single DMRS and report at least some of the first signal quality measurements to the wireless communications network, and
the second activity comprising to perform a second signal quality measurement of each dual DMRS out of the set of dual DMRS and report at least some of the second signal quality measurements to the wireless communications network.

15. The wireless communication device according to claim 14, wherein the selection of any one or more out of the first activity and the second activity based on the speed of the wireless communication device to be performed comprises:
when the speed is below a first speed threshold value, acting according to the first activity related to the single DMRS, when the speed is above a second speed threshold value, acting according to the second activity related to the dual DMRS, and when the speed is between the first speed threshold value and the second speed threshold value, acting according to both the first activity related to the single DMRS and the second activity related to the dual DMRS, wherein the second speed threshold value is equal or larger than the first speed threshold value.

16. The wireless communication device according to claim 14, wherein the wireless communication device further is configured to:

perform a first signal quality measurements of each single DMRS out of the set of single DMRS and a second signal quality measurements of each dual DMRS out of the set of dual DMRS, find a first signal quality value being highest among the results of the performed first signal quality measurements of the set of single DMRS, and find a second signal quality value being highest among the results of the performed second signal quality measurements of the set of dual DMRS, wherein the selection of any one or more out of the first activity and the second activity based on the speed of the wireless communication device to be performed further is based on the difference between the first signal quality value and the second signal quality value.

17. The wireless communication device according to claim 16, wherein the selection of any one or more out of the first activity and the second activity based on the speed of the wireless communication device to be performed comprises:

when the speed is below a first speed threshold value and when further the second signal quality value minus the first signal quality value is below a predetermined value, act according to the first activity related to the set of single DMRS, when the speed is below the first speed threshold value and when further the second signal quality value minus the first signal quality value is above the predetermined value, act according to both the first activity related to the set of single DMRS and the second activity related to the set of dual DMRS.

18. The wireless communication device according to claim 16, wherein the selection of any one or more out of the first activity and the second activity based on the speed of the wireless communication device to be performed comprises:

when the speed is above a second speed threshold value and when further the first signal quality value minus the second signal quality value is below a predetermined value, act according to the second activity related to the set of dual DMRS, and when the speed is above the second speed threshold value and when further the first signal quality value minus the second signal quality value is above the predetermined value, act according to both the first activity related to the set of single DMRS and the second activity related to the set of dual DMRS.

19. The wireless communication device according to claim 14, wherein the selection of any one or more out of the first activity and the second activity to be performed comprises: select to report signal quality measurements on any one or more out of the first wireless network and the second wireless network, and wherein, the action according to the first activity is performed when the first wireless network is selected to report signal quality measurements on, the action according to the second activity is performed when the second wireless network is selected to report signal quality measurements on, and wherein the action according to both the first activity and to the second activity is performed when both the first wireless network and the second wireless network are selected to report signal quality measurements on.

* * * * *